United States Patent [19]

Hitachi et al.

[11] Patent Number: 5,137,696

[45] Date of Patent: * Aug. 11, 1992

[54] EXHAUST GAS CLEANING DEVICE

[75] Inventors: Yuzo Hitachi; Haruo Serizawa, both of Shizuoka, Japan

[73] Assignee: Usui Kokusai Sangyo Kabushiki Kaisha, Shizuoka, Japan

[*] Notice: The portion of the term of this patent subsequent to Mar. 10, 2009 has been disclaimed.

[21] Appl. No.: 481,154

[22] Filed: Feb. 20, 1990

[30] Foreign Application Priority Data

Feb. 21, 1989 [JP] Japan ................. 1-18465[U]

[51] Int. Cl.⁵ .............................................. F01N 3/28
[52] U.S. Cl. ..................................... 422/180; 60/299; 60/301; 55/498; 55/499; 55/520; 55/521; 55/DIG. 30
[58] Field of Search ............ 422/180, 177, 168; 60/299, 301; 55/498, 499, 520, 521, DIG. 30

[56] References Cited

U.S. PATENT DOCUMENTS

| 3,969,082 | 7/1976 | Cairns et al. | 422/180 |
|---|---|---|---|
| 4,186,172 | 1/1980 | Scholz | 60/299 X |
| 4,300,956 | 11/1981 | Rosenberger et al. | 422/180 X |
| 4,665,051 | 5/1987 | Nonnenmann | 422/180 X |
| 4,719,680 | 1/1988 | Cyron | 422/180 X |
| 4,755,360 | 7/1988 | Dickey et al. | 422/177 X |
| 4,795,615 | 1/1989 | Cyron et al. | 422/180 X |
| 4,909,994 | 3/1990 | Nishizawa et al. | 422/180 |

FOREIGN PATENT DOCUMENTS 2063092 6/1981 United Kingdom ............... 422/180

Primary Examiner—Lynn Kummert
Attorney, Agent, or Firm—Lowe, Price, LeBlanc & Becker

[57] ABSTRACT

An exhaust gas cleaning device for a motor vehicle is constructed of a honeycomb core body formed by superposing a planar band made of a metal sheet and a corrugated band made from another metal sheet one over the other in a contiguous relationship and then rolling the thus-superposed bands into a multi-layered spiral form with at least one outermost layer thereof being formed of the planar band. The honeycomb core body defines a number of network-patterned axial gas flow passages and is adapted to carry an exhaust gas cleaning catalyst. At least one fin is fixed on an outer peripheral wall of the honeycomb core body.

5 Claims, 2 Drawing Sheets

EXHAUST GAS CLEANING DEVICE

BACKGROUND OF THE INVENTION

1) Field of the Invention

The present invention relates to an exhaust gas cleaning device constructed of a metal-made honeycomb core body for carrying an exhaust gas cleaning catalyst. As a cleaning means for exhaust gas from a motor vehicle, the exhaust gas cleaning device is generally installed at an intermediate point of an exhaust pipe.

More specifically, this invention is concerned with an exhaust gas cleaning device of the above sort, which is employed under severe conditions. The exhaust gas cleaning device features the use of a metal-made honeycomb core body with improved resistance to deformations and breakage by thermal expansion and stresses.

2) Description of the Related Art

Exhaust gas cloaning devices of the above soil have conventionally been fabricated in the following manner. Namely, a planar band made of a heat-resistant steel sheet and a corrugated band obtained by forming a similar steel sheet into a wavy or sinuous form are superposed one over the other in a contiguous relationship. They are rolled into a multi-layered spiral form, thereby forming a honeycomb-shaped multi-layered composite body (hereinafter called the "honeycomb core body") axially defining a number of network-patterned gas flow passages for allowing exhaust gas to flow therethrough. The honeycomb core body is then inserted into a cylindrical metal casing which is open at in both ends thereof. The honeycomb core body and metal casing are thereafter firmly joined together by brazing or soldering, so that they can withstand thermal stresses and deformations due to the high temperature of exhaust as, exothermic reactions between exhaust gas and the catalyst and the like and further vibrations while the associated motor vehicle is running. Needless to say, the planar and corrugated bands which make up the honeycomb core body are firmly joined together at contacts therebetween by any one of various suitable methods, for example, by welding or brazing.

There is however, a recent move toward constructing an exhaust gas cleaning device without a separately-fabricated metal casing, in other words, with a metal-made honeycomb core body alone from the stand point of the price competition with conventional cordierite ceramic carriers. The omission of such a metal casing naturally leads to a reduction in the cost for inserting a metal-made honeycomb core body in the metal casing and then uniting them together, namely, in the so-called canning cost, whereby a substantial cost merit can be brought about However, when the metal casing is omitted, the outermost peripheral wall of the honeycomb core body is exposed directly to the outside air so that internal heat is radiated from the outermost periperal wall of the honeycomb core body. A considerable temperature difference therefore occurs between the outermost peripheral wall of the honeycomb core body and an adjacent core portion which is located a little inside the outermost peripheral wall. In an exhaust gas cleaning device making use of a honeycomb core body of the above sort, the flow velocity of exhaust gas is faster through an axially central portion. Acordingly, the temperature of the axially central portion becomes higher than that of a peripheral core portion due to reactions of exhaust gas, which reactions are induced by a catalyst carried on the honeycomb core body. As a result, deformation forces and strains which are caused by thermal expansion and thermal stresses which occur in and/or between members (i.e., planar band and corrugated band) making up the honeycomb core body are concentrated on the outermost peripheral wall of the honeycomb core body. This may lead to cracking and breakage of the outermost peripheral wall of the honeycomb core body and therefore is very dangerous. Moreover, this may result in cracking and breakage of the planar band and corrugated band in the core portion located adjacent the outer peripheral wall of the honeycomb core body and may also accelerate the separation of a catalyst layer carried on the honeycomb core body. As a result, the cleaning performance of exhaust gas may be lowered.

OBJECTS AND SUMMARY OF THE INVENTION

The present inventors have conducted various investigations with a view toward improving the rigidity of the outermost peripheral wall of the above-described honeycomb core body which can be adapted to carry an exhaust gas cleaning catalyst thereon to provide an exhaust gas cleaning device without the need for a metal casing. As a result, fixing of one of more fins on the outermost peripheral wall of the honeycomb core body has been found extremely effective.

An object of the present invention is therefore to furnish an exhaust gas cleaning device which structurally features the use of a honeycomb core body with an outermost peripheral wall having improved rigidity, assures safety during long-term use and enjoy excellent exhaust gas cleaning performance.

In one aspect of the present invention, there is thus provided an exhaust gas cleaning device constructed of a honeycomb core body formed by superposing a planar band made of a metal sheet and a corrugated band made from another metal sheet one over the other in a contiguous relationship and then rolling the thus-superposed bands into a multi-layered spiral form with at least one outermost layer thereof being formed of the planar band. The honeycomb cor body defines a number of network-patterned axial gas flow passages and is adapted to carry an exhaust gas cleaning catgalyst. At least one fin is fixed on an outer peripheral wall of the honeycomb core body.

An exhaust gas cleaning device is exposed to severe use conditions, especially to severe thermal use conditions. Under such severe thermal use conditions, the omission of a metal casing results in the concentration of deformation forces and strains which are induced by thermal expansion and thermal stresses which occur in and between constituent members (namely, planar band and corrugated band) of the honeycomb core body, especially, on an outher peripheral wall of the honeycomb core body and a core portion adjacent the outer pripheral wall, so that the outer peripheral wall and its adjacent core portion are subjected to intensive deformation forces and strains. This may therefore lead to cracking and breakage of the outer peripheral wall of the honeycomb core body.

Owing to the fixing of at least one fin on the outer peripheral wall of the honeycomb core body in the exhaust gas cleaning device according to the present invention, the rigidity of the outer peripheral wall and its adjacent core portion has been enhanced significantly, so that the honeycomb core body, namely, the exhaust gas cleaning device can successfully withstand long-term use. In addition, the separation of expensive catalyst layers due to the aforementioned deformation forces and strains can be effectively prevented, whereby high exhaust gas cleaning performance can be retained over a long period of time.

It is possible to use the finned honeycomb core body according to the present invention after inserting the same in a separately-fabricated metal casing and then fixedly uniting them together. In this arrangement, a spacing is formed between the outermost peripheral wall of the honeycomb core body and the metal casing, thereby bringing about a further advantage that the noise of exhaust gas flowing through the honeycomb core body can be effectively reduced or deadened.

In addition, owing to the fixed provision of at least one fin on the outer peripheral wall of the honeycomb core body, the radiation of heat has been improved. The fin is therefore effective for radiating a great deal of heat which may be generated inside the honeycomb core body due to certain abnormal reactions of exhaust gas induced by an associated catalyst. The exhaust gas cleaning device according to the present invention is therefore excellent in many aspects such as safety, the stabilization of catalytic reactions and the long-term retention of high cleaning performance.

BRIEF DESCRIPTION OF THE DRAWINGS

The above and other objects, features and advantages of the present invention will become apparent from the following description and the appended claims, taken in conjunction with the accompanying claims, in which:

DETAILED DESCRIPTION OF THE INVENTION AND PREFERRED EMBODIMENTS

As has been described above, the present invention is directed to an exhaust gas cleaning device which is constructed of a metal-made honeycomb core body adapted to carry an exhaust gas cleaning catalyst (such as Pt, Pd or Rh) thereon and does not use any metal casing. The principal feature of the present invention resides in the use of a honeycomb core body, which has at least one fin fixed on an outer peripheral wall thereof, as the metal-made honeycomb core body.

In the present invention, the metal-made honeycomb core body itself has a structure such as that shown in any one of FIGS. 1–4. It can be fabricated by a conventional method. Described specifically, a honeycomb core body 1 has been fabricated by superposing in a contiguous relationship a planar band 11 made of a heat-resistant thin steel sheet having a thickness of about 0.03–0.1 mm and a corrugated band 12 obtained by forming a similar steel sheet into a wavy or sinous shape and then rolling the thus-superposed bands into a multi-layered spiral form with at least one outermost layer thereof being formed of the planar band 11. Because of this rolling, a number of network-patterned axial gas flow passages 13, which will serve as flow passages 13 for exhaust gas, have been formed automatically. Since a metal casing is omitted in the present invention, the planar band 11 may be rolled as plural layers such as double or triple layers in an outermost peripheral portion with a view toward reinforcing the outermost peripheral wall of the honeycomb core body.

As the planar band 11, a steel sheet having a thickness of 0.04 mm and a width of 75 mm, such as a heat-resistant Fe-Cr20%-Al5% stainless steel or a heat-resistant stainless steel obtained by adding one or more rare earth metals to the former stainless steel to improve the oxidation resistance can be used by way of example. As the corrugated band 12 on the other hand, it is possible to use a similar planar band after forming it into a wavy or sinuous shape. It is preferred to use an Al-containing stainless steel for each band, because $Al_2O_3$ is formed in the form of whiskers on the surfaces of the band by heat treatment and these whiskers can firmly hold an exhaust gas cleaning catalyst.

A description will next be made of the structure of one or more fins provided to improve the rigidity of the outermost peripheral wall of the honeycomb core body 1.

In the present invention, no particular limitation is imposed on the shape, number and fixing method of one or more fins fixed on the outermost peripheral wall of the honeycomb core body 1. Examples of the fin or fins may include those illustrated FIGS. 1–4 respectively.

Figure 1:
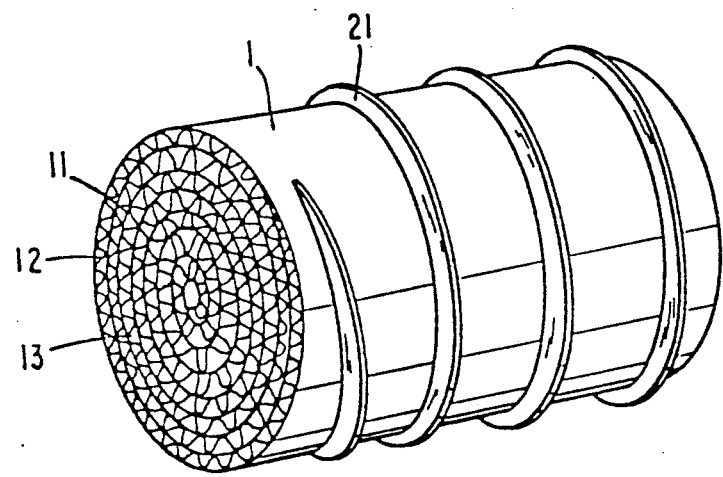
FIG. 1 is a perspective view of a finned honeycomb core bdy according to a first embodiment of the present invention.

(i) In FIG. 1 showing the first embodiment of the present invention, a spiral fin 21 is fixed on the outermost peripheral wall of the honeycomb core body 1 and extends perpendicularly outward from the outer peripheral wall.

Figure 2:
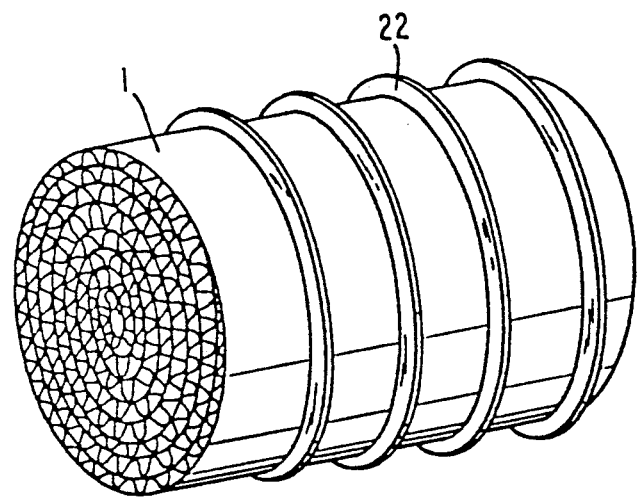
FIG. 2 is a perspective view of a finned honeycomb core body according to a second embodiment of the present invention.

(ii) In FIG. 2 depicting the second embodiment of the present invention, plural (i.e., four) ring-shaped fine 22 are fixed on the outermost peripheral wall of the honeycomb core body 1.

Figure 3:
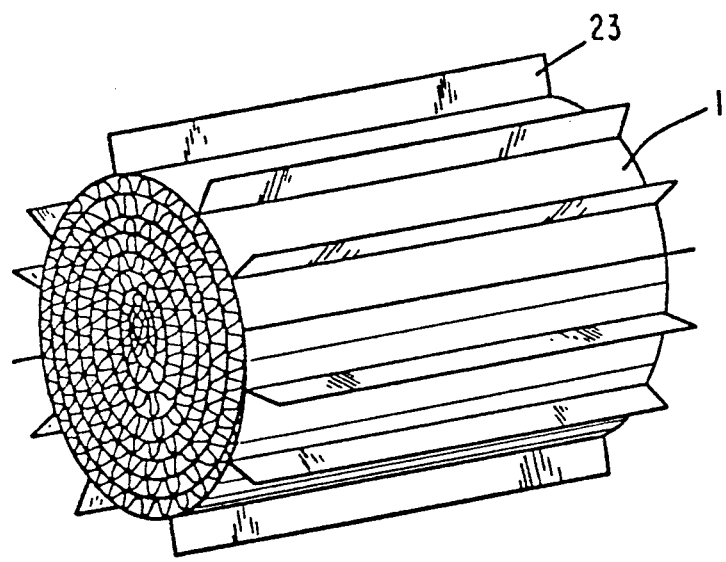
FIG. 3 is a perspective view of a finned honeycomb core body according to a third embodiment of the present invention.

(iii) In FIG. 3 illustrating the third embodiment of the present invention, plural (12) elongated straight fine 23 are fixed in parallel with a central axis of the honeycomb core body and at predetermined angular intervals on the outer peripheral wall of the honeycomb core body.

Figure 4:
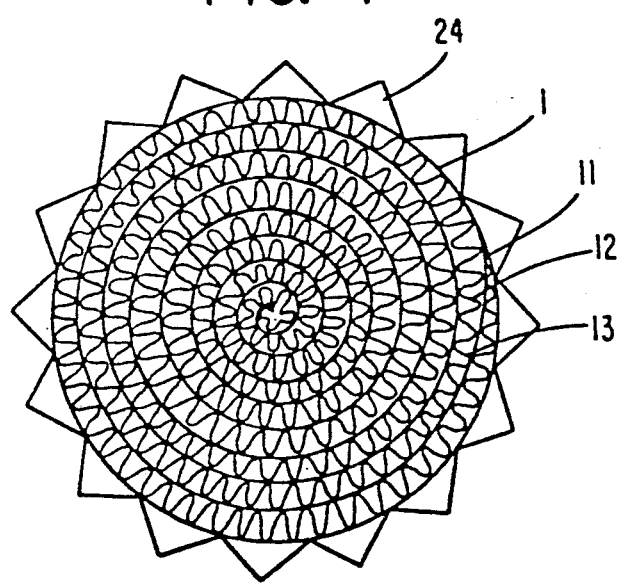
FIG. 4 is an end view of a finned honeycomb core body according to a fourth embodiment of the present invention, as viewed in the direction of a longitudinal central axis of the finned honeycomb core body.

(iv) In FIG. 4 directed to the fourth embodiment of the present invention, plural wavy fine 24 having substantially a sinous cross-section is fixed at groove portions thereof on the outer peripheral wall of the honeycomb core body.

These fin structures should be interpreted as merely illustrative. The present invention should therefore be interpreted to embraces all deformations of these shapes and combinations of parts of two or more of these shapes, which may be contemplated of by an artisan on the basis of the present invention.

For example, in FIGS. 1 through 3, each fin may be formed into a wavy or sinuous form. In this modification, the rigidity and heat radiation can be improved further. In FIG. 3, each fin may have such a length that both axial ends of the fin are indented from the corresponding axial ends of the honeycomb core body 1. In addition, in FIGS. 1 through 3, each fin may be bent at a root portion thereof into an L-shape as viewed in a transverse cross-section. This modification makes it possible to firmly fix each fin on the corresponding honeycomb core body 1.

We claim:

1. In an exhaust gas cleaning device constructed of a honeycomb core body formed by superposing a planar band made of a metal sheet and a corrugated band made from another metal sheet one over the other in a contiguous relationship and then rolling the thus-superposed bands into a multi-layered spiral form with at least one outermost layer thereof being formed of the planar band, said honeycomb core body defining a number of network-patterned axial gas flow passages and carrying an exhaust gas cleaning catalyst, the improvement comprising providing at least one fin fixed on an outer peripheral wall of the honeycomb core body and extending perpendicularly outward from said outer peripheral wall, which at least one fin improves the rigidity of the structure of the exhaust gas cleaning catalyst device.

2. The exhaust gas cleaning device of claim 1, wherein said at least one fin comprises a spiral fin fixed on the outer peripheral wall of the honeycomb core body.

3. The exhaust gas cleaning device of claim 1, wherein said at least one fin comprises at least one ring-shaped fin fixed on the outer peripheral wall of the honeycomb core body.

4. The exhaust gas cleaning device of claim 1, wherein said at least one fin comprises plural elongated fins fixed in parallel with a central axis of the honeycomb core body and at predetermined angular intervals on the outer peripheral wall of the honeycomb core body.

5. The exhaust gas cleaning device of claim 1, wherein said at least one fin comprises at least one wavy fin having substantially a sinuous cross-section fixed at groove portions thereof on the outer peripheral wall of the honeycomb core body.

* * * * *